United States Patent [19]

Owens, III

[11] 4,441,742
[45] Apr. 10, 1984

[54] CONNECTORS FOR SECURING MEMBERS TOGETHER UNDER LARGE CLAMPING

[75] Inventor: James H. Owens, III, Houston, Tex.

[73] Assignee: Armco Inc., Middletown, Ohio

[21] Appl. No.: 327,449

[22] Filed: Dec. 4, 1981

[51] Int. Cl.³ .................... F16L 35/00; F16L 55/00
[52] U.S. Cl. .................................. 285/18; 166/340; 166/351; 285/315; 285/320; 285/DIG. 21
[58] Field of Search ................. 166/340, 339, 351; 285/18, 315, 317, 320, 321, DIG. 21

[56] References Cited

U.S. PATENT DOCUMENTS

| | | |
|---|---|---|
| 1,825,774 | 10/1931 | Boynton . |
| 1,933,935 | 11/1933 | Santiago . |
| 2,470,256 | 5/1949 | McIlroy . |
| 2,657,904 | 11/1953 | Evenson . |
| 2,860,893 | 11/1958 | Clark . |
| 2,965,073 | 12/1960 | Alfieri . |
| 3,278,158 | 10/1966 | Saldana . |
| 3,321,217 | 5/1967 | Ahlstone .................... 285/315 X |
| 3,354,951 | 11/1967 | Savage et al. . |
| 3,536,344 | 10/1970 | Nelson ........................... 285/315 X |
| 3,643,984 | 2/1972 | Bucceri ........................ 285/382.7 |
| 3,675,713 | 7/1972 | Watkins ............................. 166/340 |
| 3,774,352 | 11/1973 | Weber . |
| 3,997,198 | 12/1976 | Linder . |
| 4,049,297 | 9/1977 | Reneau ....................... 285/315 X |
| 4,153,278 | 5/1979 | Ahlstone ..................... 285/315 X |
| 4,188,050 | 2/1980 | Lachte .......................... 285/315 X |
| 4,225,160 | 9/1980 | Ortloff . |
| 4,270,398 | 6/1981 | Arnold . |
| 4,290,483 | 12/1981 | Lawson ....................... 285/315 X |
| 4,337,971 | 7/1982 | Kendrick ........................ 285/320 |

Primary Examiner—Wayne L. Shedd
Attorney, Agent, or Firm—Roylance, Abrams, Berdo & Goodman

[57] ABSTRACT

Connectors, particularly remotely operated connectors used to connect underwater well members under large clamping forces, are provided with rigid rolling anti-friction elements engaged between a camming surface and a cam follower surface for converting axially directed operating motion into radial movement of a contractible and expansible annular locking means.

15 Claims, 12 Drawing Figures

CONNECTORS FOR SECURING MEMBERS TOGETHER UNDER LARGE CLAMPING

This invention relates to connectors for securing two members together with the aid of a large clamping force, and to underwater well installations embodying such connectors.

RELATED APPLICATION

Subject matter disclosed and claimed herein is also disclosed in copending application Ser. No. 327,445 filed concurrently herewith by William S. Cowan and Edward M. Galle, Jr., and Ser. No. 327,446 filed concurrently herewith by Edward M. Galle, Jr.

BACKGROUND OF THE INVENTION

The need for developing large clamping forces in connectors for securing two members together has long been recognized. Providing large clamping forces is especially important when the connector is to be used for connecting two tubular members of an underwater well installation, since the connection must then be such as to withstand not only large forces resulting from component weight and the actions of waves and currents but also large internal fluid pressures. In the underwater well field, connectors of this general type have reached an advanced state of development as disclosed, for example, in U.S. Pat. Nos. 2,962,096 Knox, 3,228,715 Neilon et al 3,321,217 Ahlstone, 3,333,870 Watkins, 4,200,312 Watkins, 4,209,193 Ahlstone.

All of the successful prior art connectors employed in the underwater well field for developing high clamping forces appear to employ annular locking means, varying from annularly arranged collets or annularly arranged arcuate segments to a single split locking ring, the locking means being carried by one of the members to be connected, the other member presenting an annular groove with which the locking means engages. Opposed transverse end faces are provided, each on a different one of the members being connected or on a different one of the connector members, the transverse end faces being disposed to be clamped together as the connector is made up, the annular locking means and groove having mating frustoconical shoulders so arranged as to generate the large clamping force to clamp the end faces together as the locking means is forced into engagement in the groove. When the connector is to be made up in an underwater location not directly accessible for manual operations, the connector is provided with a power device or devices, usually one or more fluid pressure operated rectilinear motors, for actuating the locking means. To convert the action of the power device into effective movement of the locking means, it has become a standard practice to have the power device force a camming ring axially relative to the members to be connected, the camming ring having a frustoconical camming face which slidably engages the locking means to force the locking means generally radially into engagement with the groove.

Though such connectors have achieved considerable success and wide acceptance in the field, requirements imposed by the users and potential users of such connectors have become increasingly difficult to satisfy. This difficulty is particularly severe in the underwater well field, where the water depths in which wells are being drilled have greatly increased, with an attendant increase in the forces, both external and internal, which must be accommodated by the connector. As an example, it is to be noted that some underwater wellheads are now being specified to withstand internal pressures as great as 15,000 p.s.i., so that that magnitude of pressure must be accepted by, e.g., the connector which secures the blowout preventer stack to a wellhead lower body. Thus, while there has in all events been a continuing need for improving such connectors, that need has been amplified by the increasing severity of potential users' specifications.

A particular problem posed by the need for very large clamping forces in such connectors arises because, on the one hand, the power available from acceptable power devices is limited by size constraints for the power device or devices while, on the other hand, losses due to friction at the camming surfaces demand large actuating power if actuation of the locking means is to result in the desired large clamping forces. Though workers in this field have expended much effort in attempting to overcome that and other problems, overall effectiveness of such connectors has failed to keep pace with the increasing need for improvement.

OBJECTS OF THE INVENTION

A general object of the invention is to achieve in such connectors a marked increase in the clamping force developed by the connector without requiring that the actuating power required to develop the clamping force be increased.

Another object is to devise such a connector in which sliding friction involved in converting the actuating movement to radial movement of the locking means is at least greatly reduced while the necessary direct metal-to-metal contact to transfer the actuating force to the locking means is preserved.

A further object is to provide improved wellhead constructions embodying such connectors.

SUMMARY OF THE INVENTION

Connectors according to the invention employ a connector body which is adapted to be rigidly secured to one of the two members to be connected and which is annular and carries both the annular locking means of the connector and the driving ring for actuating the locking means, as well as the power means for moving the driving ring axially of the connector when a power means forms part of the connector. The locking means can comprise an annularly arranged series of locking devices, typically arcuate segments, or a split ring locking member, and includes an annular cam follower surface which tapers relative to the longitudinal axis of the connector. The driving ring is concentric with the locking means and presents an annular camming surface which faces the cam follower surface, is concentric therewith, is parallel to the cam follower surface and is spaced radially therefrom. A plurality of rigid rolling antifriction elements, typically spherical metal balls or cylindrical rollers, are disposed between and engaged with the cam follower surface of the locking means and the camming surface of the driving ring, the arrangement being such that, for any positions of the locking means and the driving ring, the rolling anti-friction elements are maintained in direct engagement with both the cam follower surface and the camming surface. Though in some cases the driving ring can be operated manually, it is advantageous for the connector body also to carry power means, such as one or more remotely controlled fluid pressure operated rectilinear motors, for moving the driving ring axially of the connector. During axial movement of the driving ring from a first to a second position, the camming surface, the rolling antifriction elements and the cam follower surface coact to force the locking means radially into engagement with, e.g., a tapered side wall of locking groove presented by the other of the two members to be connected.

IDENTIFICATION OF THE DRAWINGS

Particularly advantageous embodiments of the invention will be described in detail with reference to the accompanying drawings, wherein.

DETAILED DESCRIPTION OF THE INVENTION

The Embodiment of FIGS. 1-5

Figure 1:
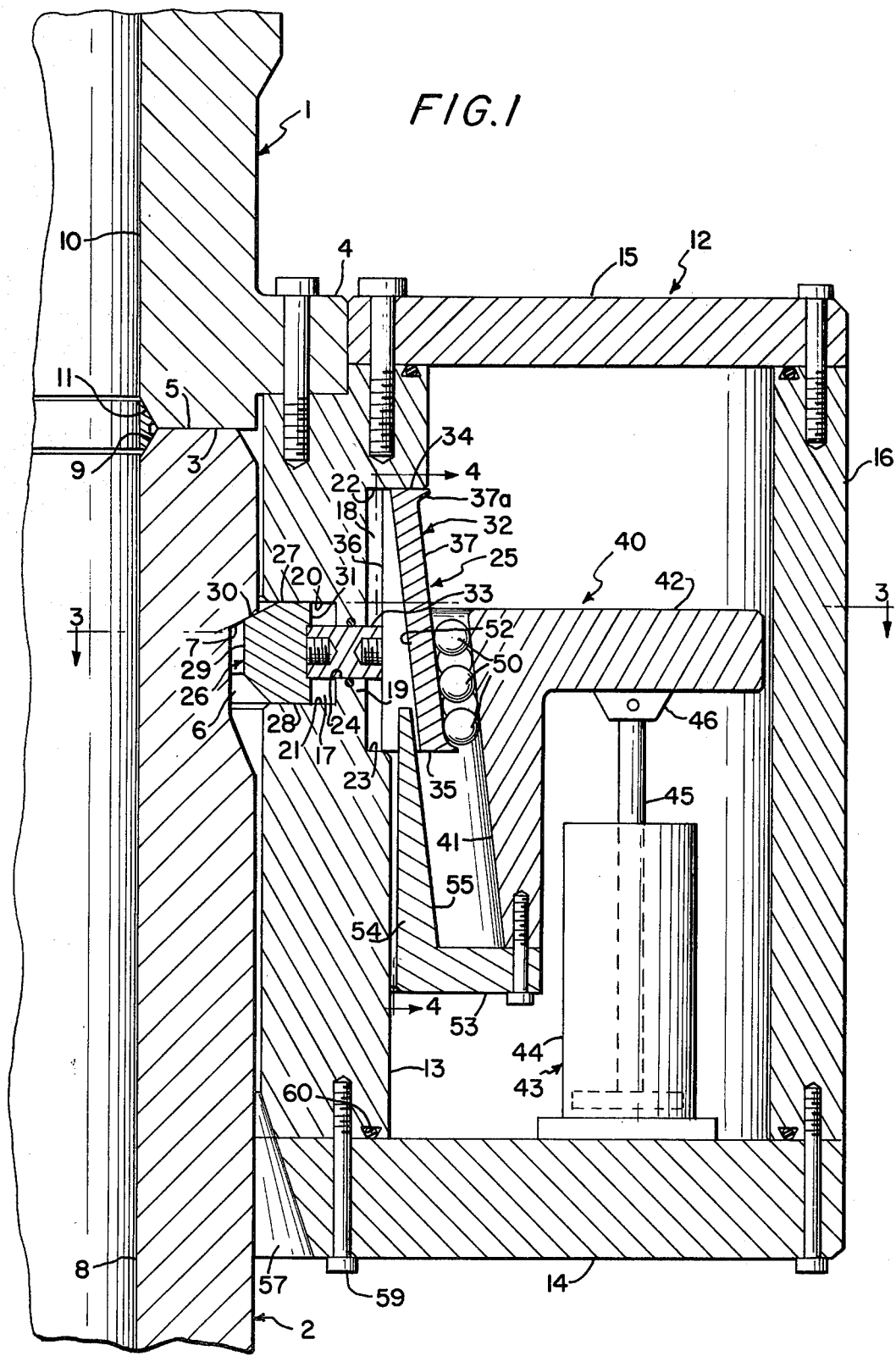
FIG. 1 is a view, partly in side elevation and partly in vertical cross section, of a portion of an underwater wellhead assembly embodying a connector according to one embodiment of the invention, with the connector fully engaged.

FIGS. 1-5 illustrate one embodiment of the invention as employed to secure the lowermost body 1 of a blowout preventer stack to an upright wellhead lower body 2 in an underwater wellhead installation. Of conventional form, body 1 includes a flat transverse annular lower end face 3 and a transverse annular outwardly projecting lower end flange 4. Also of conventional configuration, body 2 presents a flat transverse annular upper end face 5, dimensioned to mate with end face 3 of body 1, and a transverse annular outwardly opening locking groove 6 spaced a predetermined distance below end face 5. The side wall 7 of groove 6 nearer upper end face 5 is frustoconical, tapering downwardly and inwardly, typically at an angle of 25° as shown. Body 2 has a right cylindrical upright through bore 8, the wall of the bore terminating at the upper end of the body in a frustoconical downwardly and inwardly tapering seal seat surface 9. Body 1 has a right cylindrical through bore 10 of the same diameter as bore 8, a frustoconical upwardly and inwardly tapering seal seat surface 11 joining the wall of bore 10 at the bottom end of body 1, surfaces 9 and 11 being complementary.

Rigidly secured to flange 4 of body 1 is an annular connector body, indicated generally at 12, and comprising a segment-carrying ring 13, a transverse annular support plate 14 secured to the bottom end of ring 13 and projecting outwardly therefrom, a transverse annular closure member 15 secured to the top of ring 13 and projecting outwardly therefrom, and a right cylindrical outer wall member 16 bridging the gap between plate 15 and member 15 and secured to both of these members. Ring 13 is concentric with bore 10 and has a right cylindrical inner periphery of a diameter to closely embrace the right cylindrical outer surface of the upper end portion of body 2. Formed as an integral metal piece, ring 13 has a transverse annular inwardly opening groove 17 and a transverse annular outwardly opening groove 18, the two grooves being separated by an annular web 19 concentric with the grooves. Groove 17 has a flat upper wall 20 and a flat lower wall 21. Groove 18 is of substantially greater axial width than groove 17 and has flat upper and lower walls 22 and 23, respectively. All of walls 20-23 lie in planes at right angles to the central axis of body 1. Web 19 is provided with a plurality of circumferentially spaced radially extending right cylindrical bores 24.

Grooves 17, 18 and bores 24 accommodate a plurality of mutually identical segment units, one of which is indicated generally at 25, FIG. 1. Each segment unit 25 comprises an arcuate segment body 26 having a flat upper surface 27, a flat lower surface 28, an arcuate inner face 29, a shoulder 30 which joins faces 27 and 29 and lies in a frustoconical plane tapering downwardly and inwardly, and an arcuate outer surface 31. The space between surfaces 27 and 28 is such that, with the segment body in place as seen in FIG. 1, those faces slidably engage walls 20 and 21, respectively, of groove 17. Each segment unit 25 also comprises a follower body 32, located in groove 18, and a connector pin 33 extending through one of the bores 24 in web 19 and rigidly interconnecting bodies 26 and 32. Follower bodies 32 have upper and lower surfaces 34 and 35, respectively, an arcuate inner surface 36 and an outer cam follower surface 37 which lies in a frustoconical plane and tapers upwardly and inwardly when the segment unit is in place on connector body 12. Cam follower surface 37 is recessed so that a continuous outwardly projecting retaining lip 37a extends along the upper, lower and end edges of surface 37. Segment bodies 26 and follower bodies 32 can be secured rigidly to the respective pins 33 by threaded fasteners, as shown. Connector pins 33 have right cylindrical surfaces sized to be slidably embraced by the wall of the corresponding bore 24, as shown.

There is a substantial radial distance between the outer periphery of segment-carrying ring 13 and outer wall member 16 and within the annular space thus provided is disposed a continuous driving ring 40 having an inner frustoconical surface 41 which tapers upwardly and inwardly and is parallel to and spaced outwardly from cam follower surface 37 of the locking means, surfaces 37 and 41 being concentric. Driving ring 40 includes at its upper end a transverse annular outwardly projecting annular flange 42 of substantial thickness. A plurality of circumferentially spaced fluid pressure operated rectilinear hydraulic motors 43 are disposed between flange 42 and the underlying portion of support plate 14, the cylinder 44 of each motor 43 being secured rigidly to support plate 14 in such fashion that the axis of rectilinear movement of each motor is parallel to the longitudinal axis of the connector. The piston rods 45 of motors 43 project upwardly, and the upper end of each piston rod 45 is connected to flange 42 by a clevis 46 in such fashion that the pivotal axis between the piston rod and clevis is chordal with respect to flange 42. From the foregoing description and with reference to FIG. 1, it will be apparent that simultaneous energization of the motors 43 to extend the piston rods 45 upwardly will drive ring 40 upwardly relative to follower bodies 32, while energization of the motors in the opposite sense will drive ring 40 downwardly relative to bodies 32. To accomplish such operation of the motors, all of the motors are connected in parallel to a source of fluid under pressure (not shown) typically located at an operational base at the water surface, suitable conventional valving (not shown) being provided for simultaneously energizing the motors.

Inner surface 41 of driving ring 40 constitutes an unbroken camming surface. A plurality of rigid, rolling antifriction elements 50, in this embodiment spherical metal bearing balls, are disposed between camming surface 41 and the annular cam follower surface constituted by surfaces 37 of follower bodies 32. Antifriction elements 50 are at all times in direct metal-to-metal engagement with both surfaces 37 and 41. To assure that such engagement continues throughout the total axial excursion of driving ring 40, camming surface 41 is made substantially longer, axially of the driving ring, than is surface 37.

Figure 2:
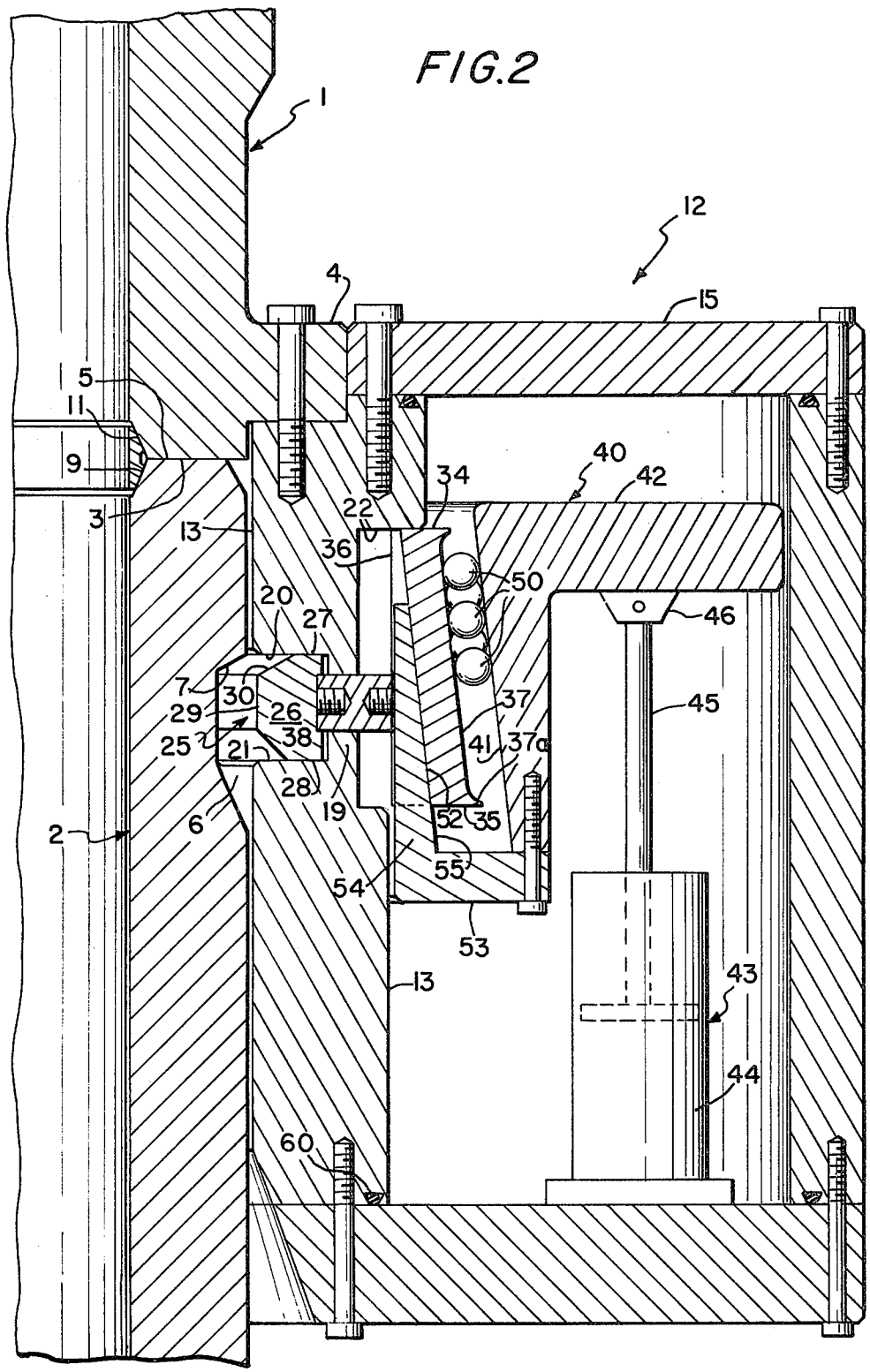
FIG. 2 is a fragmentary vertical sectional view of the assembly of FIG. 1, showing the connector with its locking means fully retracted to its inactive position.
Figure 3:
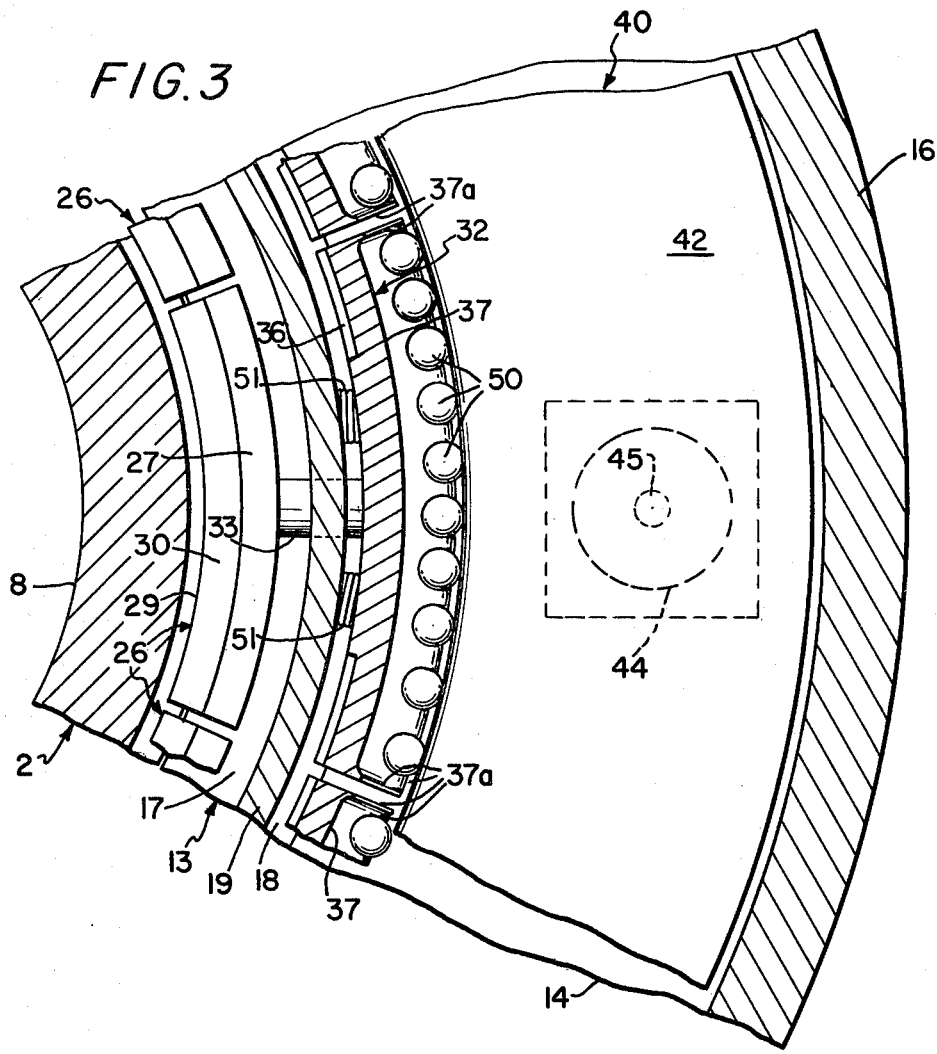
FIG. 3 is a fragmentary transverse cross-sectional view taken generally on line 3—3, FIG. 1.
Figure 5:
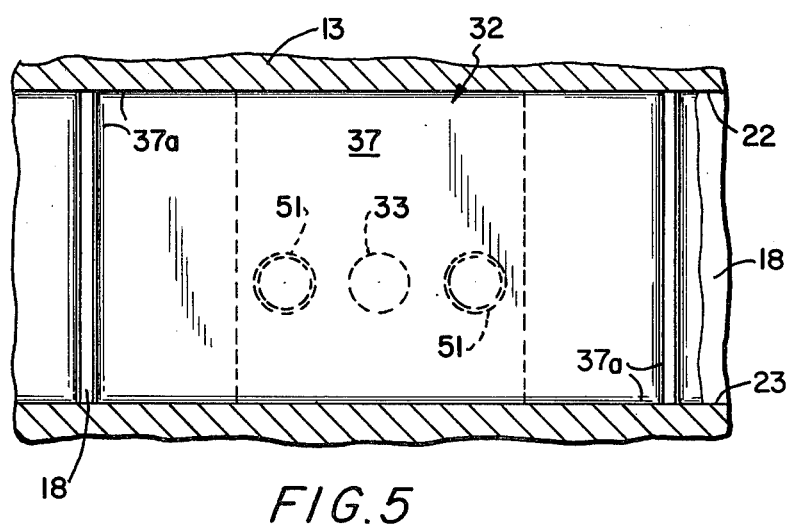
FIG. 5 is a fragmentary side elevational view taken generally on line 5—5, FIG. 1.

As seen in FIGS. 3 and 5, follower bodies 32 are of substantial arcuate length. Each body 32 is provided with two inwardly opening bores, each on a different side of the corresponding pin 33, each bore accommodating a compression spring 51 engaged between the outer surface of web 19 and the follower body in such manner as to resiliently bias the follower body outwardly, thus assuring that balls 50 are firmly engaged between surfaces 37 and 41 when segment units 25 are in their outermost, inactive positions, seen in FIG. 2.

Figure 4:
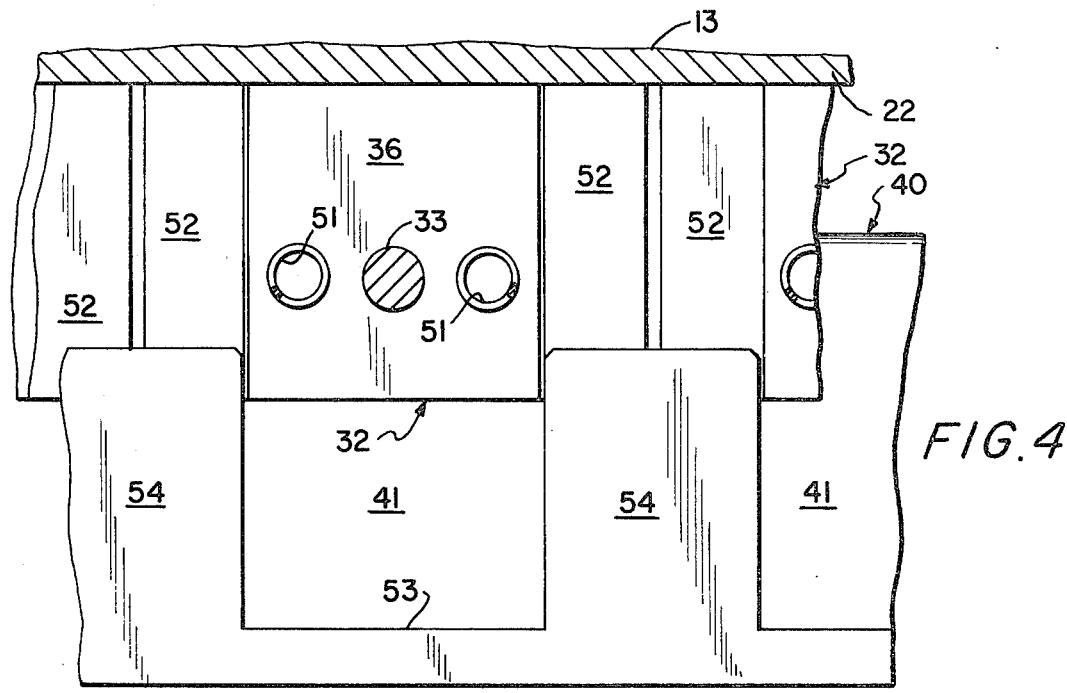
FIG. 4 is a fragmentary vertical sectional view taken generally on line 4—4, FIG. 1.

To provide redundancy for withdrawal of the segment units 25 radially from their engaged positions, the inner portions of each follower body 32 are cut away, at each end of the follower body, to provide a cam surface 52 which slants upwardly and inwardly at the same angle as does cam follower surface 37. Secured to the bottom of driving ring 40 is an annular retracting ring 53 which, as seen in FIG. 4, includes a plurality of upwardly projecting portions 54 each presenting an upwardly and inwardly slanting camming surface 55 disposed at the same angle as surfaces 37, 41 and 52. Portions 54 are so located on retracting ring 53 and are of such arcuate width that each portion 54 engages beneath a different adjacent pair of the surfaces 52, as seen in FIG. 4. The dimensions and position of ring 53 and portions 54 are such that, when driving ring 40 is in its lowermost position, so that the shoulder constituted by portions 30 of the segment bodies 26 engages side wall 7 of locking groove 6, camming surfaces 55 of the retracting ring are in close proximity to but not in heavy sliding contact with surfaces 52.

The inner periphery of support plate 14 and the adjacent corner of ring 13 are chamferred to provide an upwardly and inwardly tapering frustoconical surface 57 serving to guide and center the combination of body 1 and connector body 12 as body 1 is landed on body 2.

Support plate 14 is secured to the flat lower face of ring 13, as by circumferentially spaced studs 59, and the lower face of ring 13 has a groove accommodating an O-ring 60 which seals between ring 13 and plate 14. O-ring seals are similarly provided between the lower end of outer wall member 16 and support plate 14, between the upper end of wall member 16 and upper closure member 15, and between the inner peripheral portion of member 15 and the upper end of ring 13, as shown.

In establishing the connection illustrated in FIG. 1, the complete blowout preventer stack including connector body 12 is assembled, either on land or on the operational base at the water surface and the assembly is connected to a riser which serves as a handling string (not shown). Hydraulic connections are made up to the motors 43 and the motors are energized to drive ring 40 to its upper position, FIG. 2, the motors being then maintained in that condition by continued supply of pressure fluid. The handling string is then manipulated to lower the complete blowout preventer stack toward the wellhead, with the aid of a conventional guidance system, with fluid communication being maintained with motors 43 conventionally, as by hoses running down the handling string, and body 1 is landed on wellhead body 2, as illustrated in FIG. 2. Energization of motors 43 is then reversed, causing the motors to force driving ring 40 downwardly relative to segment-carrying ring 13. As the driving ring descends, its camming surface 41 remains parallel to the cam follower surface constituted by surfaces 37 of follower bodies 32. Since segment units 25 cannot move downwardly, being held against axial movement by ring 13, surface 41, rolling antifriction elements 50 and surfaces 37 coact to drive segment units 25 radially inwardly simultaneously. Such movement brings the frustoconical shoulder constituted by shoulder portions 30 into flush engagement with the frustoconical side wall 7 of groove 6. As the shoulder and side wall come into initial flush engagement, application of fluid under pressure to motors 43 is continued until the wedging coaction of shoulder portions 30 and side wall 7 establish the desired large clamping force on faces 3 and 5. When the blowout preventer stack is to be recovered, pressure fluid is supplied simultaneously to motors 43 to drive piston rods 45 upwardly, returning driving ring 40 to the upper position seen in FIG. 2. Upward movement of the driving ring causes camming surfaces 55 of portions 54 of retracting ring 53 to engage with cam surfaces 52. Since segment units 25 are restrained by ring 13 against axial movement, upward movement of the retracting ring causes surfaces 52 and 55 to coact to force segment units 25 outwardly, withdrawing the inner peripheral portions of segment bodies 26 from groove 6 so that the combination of body 1 and connector body 12 is free for upward withdrawal from body 2 and the blowout preventer stack, including body 1 and connector body 12, is recovered by manipulation of the handling string.

Considering FIG. 3, it will be seen that, with the annular locking means fully contracted, so that segment units 25 are in their innermost positions, small spaces remain between the adjacent end faces of follower bodies 32. It will be understood that, when the locking means is fully expanded, to the position shown in FIG. 2, the spaces between the adjacent end faces of the follower bodies necessarily increase and become significantly large in relation to the diameters of balls 50. However, balls 50 are prevented by lips 37a from engaging the edges which define such spaces, being confined by the lips 37a to positions in which surfaces 37 directly oppose the uninterrupted cam surface 41. Advantageously, lips 37a have inner walls which are of arcuate transverse cross section, as shown.

Figure 5A:
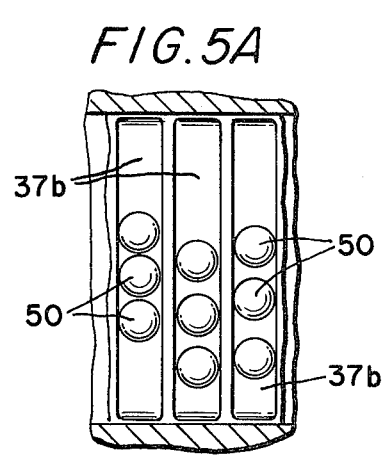
FIG. 5A is a view similar to FIG. 5 showing a cam follower portion of the connector in modified form.

Alternatively, as shown in FIG. 5A, surfaces 37 can be interrupted by a plurality of axially extending grooves 37b, a plurality of balls 50 being disposed in each of grooves 37b and the side walls of the groove loosely restraining the balls against movement circumferentially of the locking means relative to the follower bodies. It will be understood that, in this modified form of the locking means, the inner walls of grooves 37b lie in a common frustoconical plane and constitute the cam follower surface.

The effectiveness of connectors of this general type depends upon the mechanical advantage afforded by the tapered surfaces employed to convert actuating force into clamping force, and this mechanical advantage is heavily dependent upon the coefficient of sliding friction at the various sliding surfaces. If the angle of taper for side wall 7 and shoulder portions 30 is 25° and the angle of taper of camming surfaces 37 and 41 is, say, 4.75°, a theoretical mechanical advantage of more than 25 can be calculated if the coefficient of sliding friction is taken as zero. Overall efficiency of the connector can be taken as the actual mechanical advantage divided by the theoretical mechanical advantage with the result multiplied by 100 to give efficiency in percent. Assuming, for simplicity, that the coefficients of sliding friction for all sets of sliding surfaces in the device are equal, calculation shows that when the coefficient of sliding friction increases from zero to 0.1 efficiency drops from 100% to 30%. In the connector shown in FIGS. 1–5, sliding friction comes into play at all sliding surfaces, but by the laws of statics it can be shown that the sliding friction at the camming surface and cam follower surface reduces the efficiency of the connector more than does the sliding friction at other points. The invention thus provides a structure in which the sliding friction is reduced to a practical minimum, so long as the advantage of full wedging engagement of side wall 7 and shoulder 30 is retained, and the efficience of the connector is accordingly markedly increased.

Comparing FIGS. 1 and 2, it will be seen that cam follower surface portions 37 and camming surface 41 are of substantial axial length, considering the number of balls 50 engaged therebetween, and the balls are therefore free to roll essentially without slippage as ring 40 is actuated from one of its extreme positions to the other.

Figure 6:
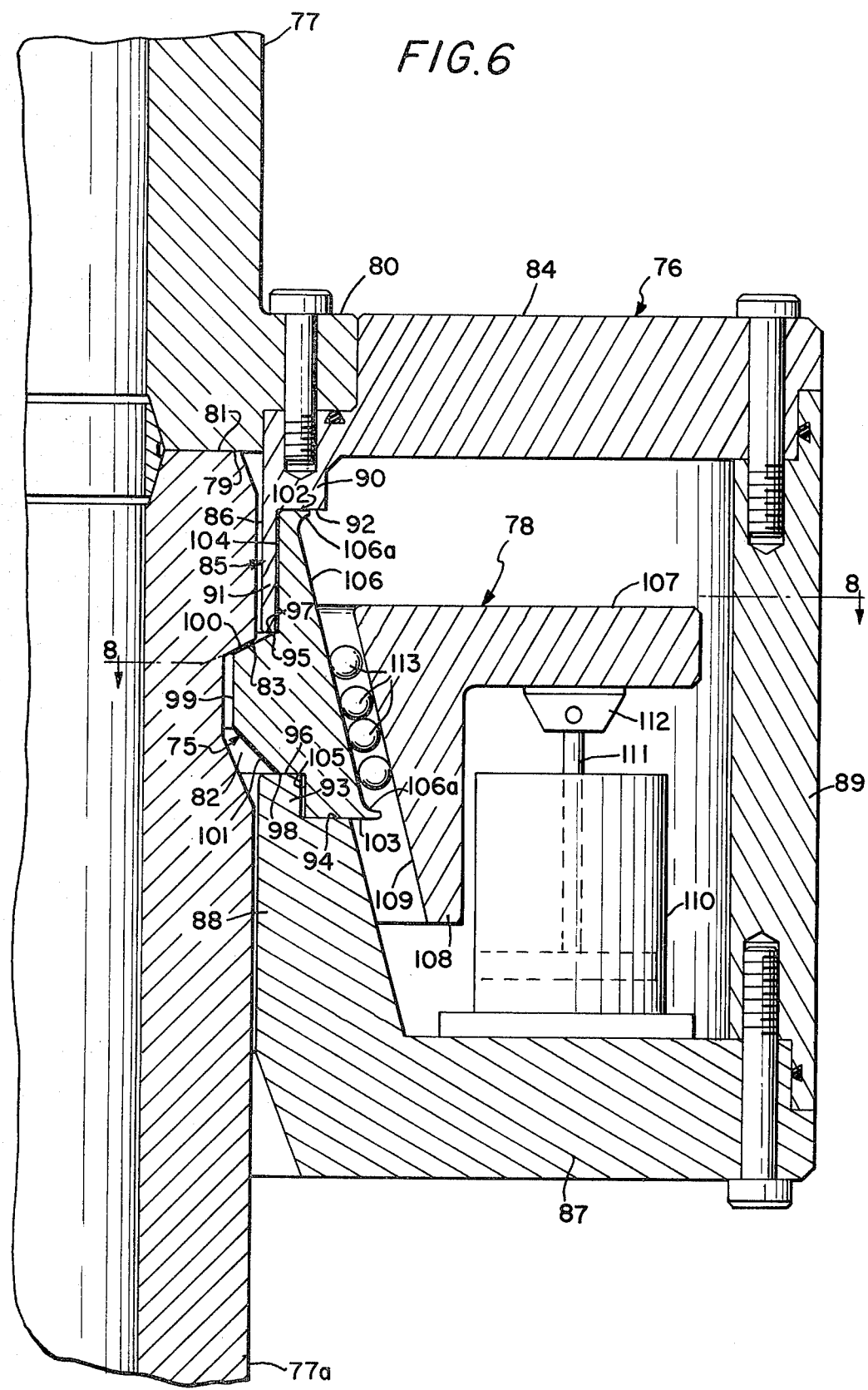
FIG. 6 is a view similar to apparatus in which the connector is constructed according to another embodiment of the invention.
Figure 7:
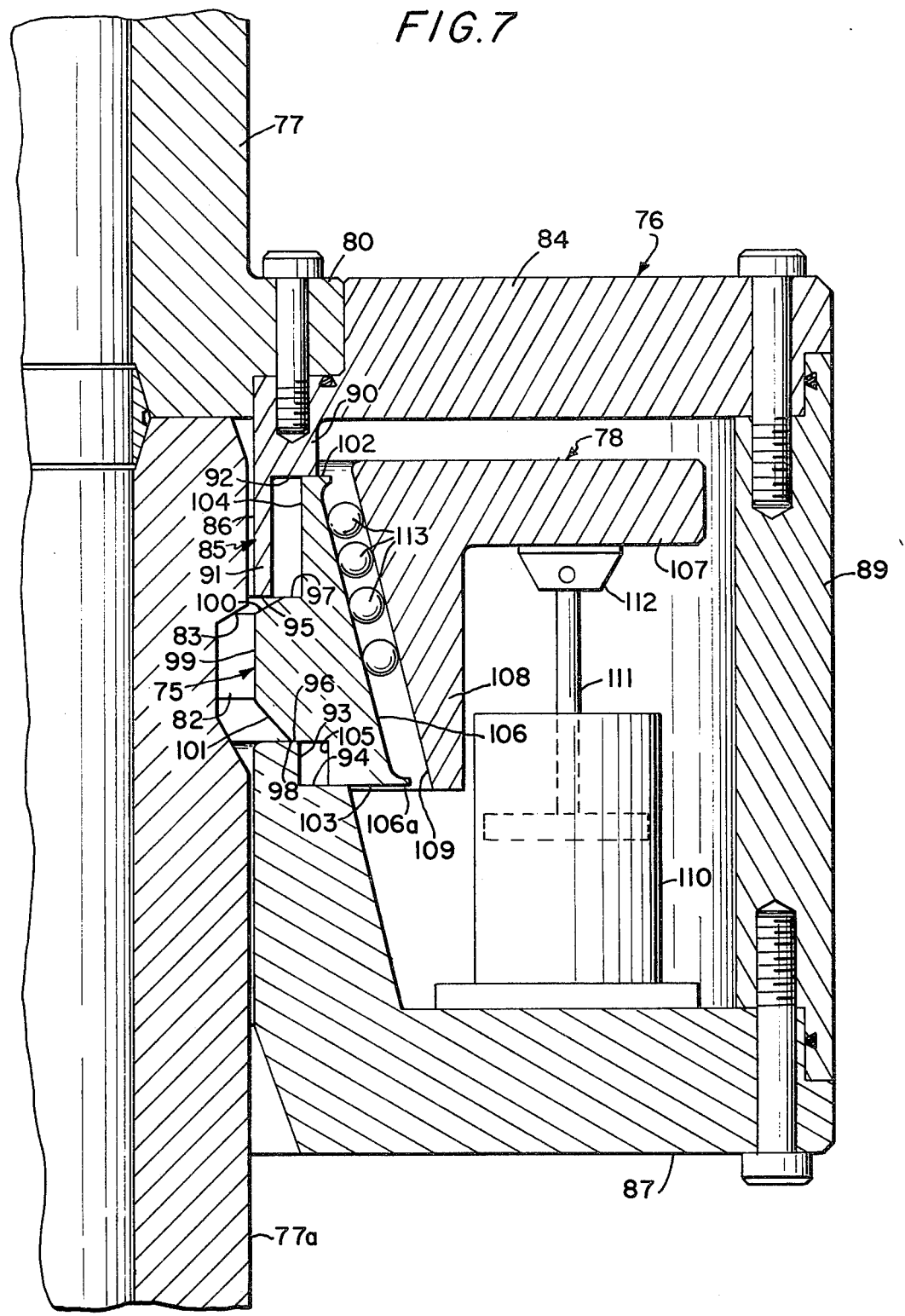
FIG. 7 is a view similar to FIG. 2 of the apparatus shown in FIG. 6.
Figure 8:
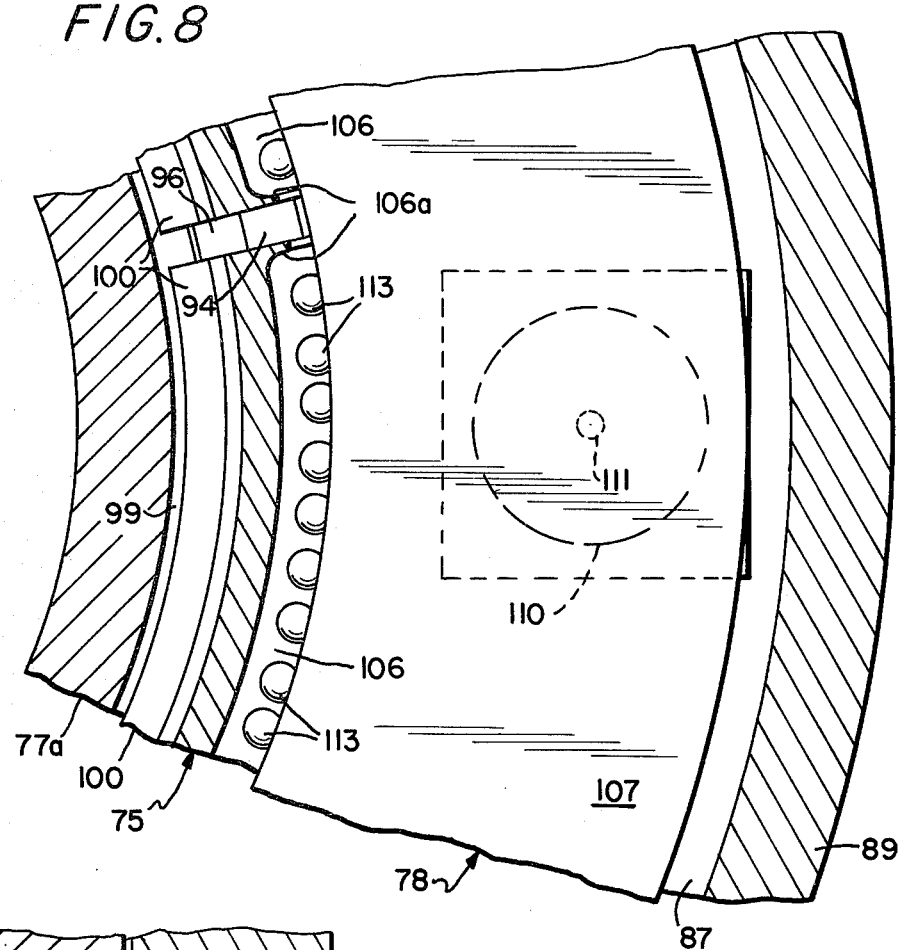
FIG. 8 is a transverse cross-sectional view taken generally on line 8—8, FIG. 6.

The Embodiment of FIGS. 6–8

Though the embodiment of the invention shown in FIGS. 1–5 employs an annular locking means made up of a plurality of arcuate segment units, other forms of expansible and contractible annular locking means can be employed. Thus, FIGS. 6–8 illustrate locking means in the form of a resilient metal split ring 75 supported by a connector body 76 secured to an upper wall member 77, the split ring being actuated by a power operated driving ring 78 to connect upper member 77 to a lower member 77a.

Upper member 77 has a downwardly directed end face 79 and an outwardly projecting transverse annular lower flange 80. Lower member 77a has an upwardly directed end face 81 dimensioned to mate with face 79. The lower member also has a transverse annular outwardly opening locking groove 82 the upper side wall 83 of which is frustoconical, tapering downwardly and inwardly. Connector body 76 comprises a flat annular upper plate 84 secured, as by circumferentially spaced studs, to flange 80 and having a downwardly projecting inner cylindrical flange 85 the right cylindrical inner surface 86 of which is dimensioned to closely surround the outer surface of member 77a above the locking groove. Body 76 also includes a flat annular lower plate 87 having at its inner periphery an upwardly projecting annular flange 88, the right cylindrical inner surface of flange 88 being coplanar with the inner surface of flange 85. Plate 87 is rigidly secured to upper plate 84 by a heavy cylindrical outer wall member 89, as shown.

Flange 85 includes an upper portion 90 of greater radial thickness and a lower portion 91 of decreased thickness, the two portions being joined by a flat transverse annular shoulder 92. Similarly, flange 88 has an upper portion 93 of decreased radial thickness joined to the main body of the flange at a shoulder 94. The two flanges present opposing end faces 95 and 96, respectively, which are mutually opposed flat transverse annular surfaces.

Split ring 75 includes an inner portion defined by flat upper and lower faces 97 and 98, respectively, a right cylindrical inner surface 99, a frustoconical locking shoulder 100 joining surfaces 97 and 99, and a lower frustoconical surface 101 joining surfaces 98 and 99. Ring 75 also includes an axially longer outer portion defined by flat upper and lower surfaces 102 and 103, respectively, a right cylindrical inner surface 104 which joins upper surface 102 and face 97, a right cylindrical inner surface 105 which joins face 98 and surface 103, and an outer cam follower surface 106 which is frustoconical and tapers upwardly and inwardly. Surface 106 is recessed, the upper, lower and end edges of that surface being defined by outwardly projecting lips 106a.

Driving ring 78 is an integral continuous piece comprising a relatively thick flat annular portion 107 extending at right angles to the connector axis, and a dependent annular flange 108 combining with the inner peripheral portion 107 to present an upwardly and inwardly tapering frustoconical camming surface 109 which tapers at the same angle as does cam follower surface 106 and is concentric with and spaced outwardly from surface 106. A plurality of fluid pressure operated rectilinear motors 110 are arranged in a circumferentially spaced series below portion 107 of the driving ring, the cylinder bodies of the motors being secured rigidly to the upper face of lower plate 87 of the connector body, with the cylinder bodies and piston rods 111 extending vertically upwardly, the piston rods each being connected to portion 107 of the driving ring by a clevis 112.

The space between camming surface 109 and cam follower surface 106 is occupied by a plurality of rigid metal balls 113, the balls being mutually identical and each ball being in direct engagement with both surfaces 106 and 109. Camming surface 109 is axially somewhat longer than cam follower surface 106 and the effective axial extent of each of surfaces 106, 109 is markedly greater than the axial space required to accommodate the total number of balls 113. The dimensions of rings 75 and 78 are such that, with balls 113 engaged between surfaces 106 and 109, and with ring 78 in its uppermost position, ring 75 is still not allowed to return to its fully relaxed and undistorted condition, and the spring force of ring 75 therefore still maintains balls 113 engaged in compression between surfaces 106, 109.

Operation of the connector of FIGS. 6-8 is generally the same as explained for the connector of FIGS. 1-5. Thus, when driving ring 78 occupies its uppermost position, as seen in FIG. 7, camming surface 109 is spaced outwardly from the inner periphery of connector body 76 sufficiently to allow resilient split ring 75 to relax toward its undistorted condition and expand to such an extent that the inner diameter of the split ring exceeds the outer diameter of lower member 77a and connector body 76 can therefore be telescoped over the upper end of lower member 77a to bring ring 75 into transverse alignment with locking groove 82. When motors 110 are energized to force ring 78 downwardly to the position shown in FIG. 6, camming surface 109, balls 113 and cam follower surface 106 coact to contract split ring 75 until the inner periphery of the split ring extends into groove 82 and locking shoulder 101 comes into flush engagement with the upper side wall of the groove. Continued application of pressure fluid to motors 110 causes shoulder 100 and side wall 83 of groove 82 to coact to clamp members 77 and 77a together, with the clamping force applied to end faces 79 and 81.

It is to be noted that balls 113 are in essentially free rolling contact with surfaces 106 and 109 throughout the entire excursion of ring 78. Thus, actuation of ring 78 from the position shown in FIG. 6 to that seen in FIG. 7 causes balls 113 to roll to the positions seen in FIG. 7, essentially without slippage between the balls and either surface 106 or 109. Similarly, when the connector is made up by actuating ring 78 from the position shown in FIG. 7 to that seen in FIG. 6, balls 113 again roll to the positions seen in FIG. 6.

Figure 11:
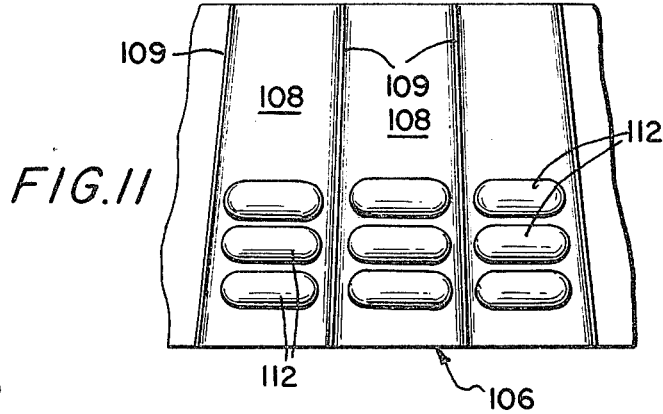
FIG. 11 is a fragmentary side elevational view of a cam follower and anti-friction elements forming part of the connector of FIGS. 9 and 10.
Figure 10:
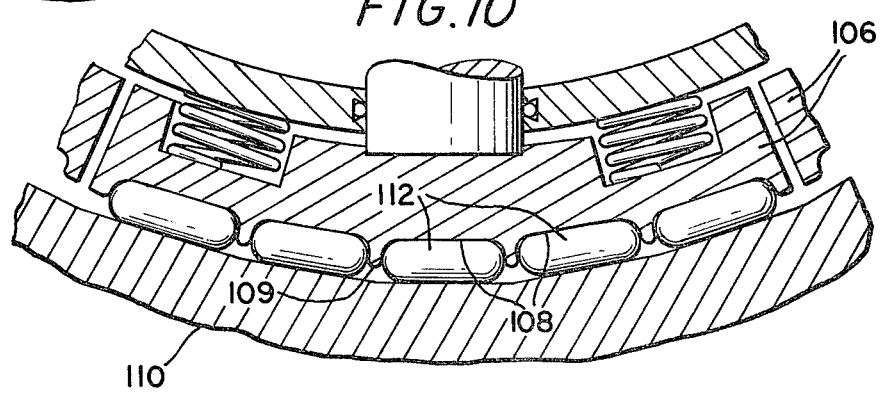
FIG. 10 is a transverse cross-sectional view taken generally on line 10—10, FIG. 9.
Figure 9:
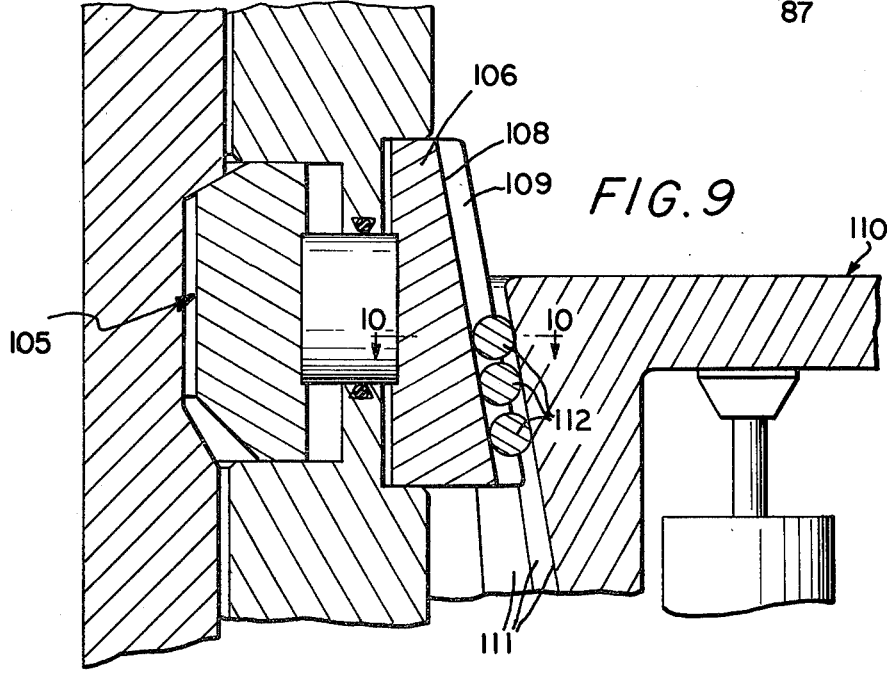
FIG. 9 is a fragmentary vertical cross-sectional view of a portion of a connector according to another embodiment of the invention.

The Embodiment of FIGS. 9-11

As an alternative to the spherical balls of FIGS. 1-8, connectors according to the invention can employ other forms of rolling antifriction elements, one of which is illustrated in FIGS. 9-11. Here, the annular locking means comprises a plurality of annularly arranged segment units 105 having cam follower bodies 106 of special form but otherwise identical with segment units 25 of the embodiment of FIGS. 1-5. Follower bodies 106 are machined from a blank having a frustoconical outer surface which tapers upwardly and inwardly in the finished assembly. For each follower body, the frustoconical outer surface of the blank is machined to provide a plurality of axially extending grooves defined by a flat inner wall 108 and two narrow side walls 109. Walls 108 each lie in a plane which is chordal with respect to the original frustoconical surface at all points along the length of the wall. Side walls 109 converge upwardly, as seen in FIG. 11, in accordance with the angle of the taper of the original frustoconical surface.

Driving ring 110 is machined from a metal piece having a frustoconical inner surface tapering in the same direction and at the same angle as do walls 108, the inner surface of ring 110 being cut away to provide a plurality of flat surfaces 111 equal in number to the walls 108 of the assembly of follower bodies 106, surfaces 111 each lying in a plane which is chordal to the original frustoconical inner surface of the piece at all points along the length of the surface 111. Considering that walls 108 make up one generally frustoconical surface and that surfaces 111 make up another, the inner diameter of the camming surface constituted by surfaces 111 is significantly larger than the diameter of the cam follower surface constituted by walls 108. Thus, as will be clear from FIGS. 9 and 10, when driving ring 110 is disposed in one rotational position in concentric surrounding relation with the annular series of follower bodies 106, each of the surfaces 111 is parallel to and spaced outwardly from a different one of the walls 108.

A plurality of rigid metal rollers 112 are employed, the rollers being arranged in equal groups with each group disposed in a different one of the grooves in the follower bodies 106. Rollers 112 have right cylindrical outer surfaces of a diameter significantly exceeding the greatest radial dimension of side walls 109 of the grooves. The rollers are identical, and of a length slightly less than the closest spacing between side walls 109. The ends of the rollers are spherical. In the assembled connector, each group of rollers 112 is engaged between a different pair of the opposed surfaces 108 and 111.

Save for its inner face, driving ring 110 is identical to driving ring 40, FIGS. 1-4, and the driving ring is actuated by a plurality of fluid pressure operated rectilinear motors 113 as hereinbefore described.

It will be apparent that the connector of FIGS. 9-11 employs an annular locking means, constituted by the plurality of segment units 105, and that the follower bodies of the segment units present a generally frustoconical cam follower surface constituted by the inner walls 108 of the grooves. Similarly, the driving ring 110 presents an inner camming surface constituted by the surfaces 111. Rollers 112 constitute rolling antifriction elements disposed between and engaged with the opposing pairs of surfaces 108, 111 in all operational positions of the driving ring. Except for the fact that rollers 112 have a significantly greater rolling engagement with the camming and cam follower surfaces, operation of this embodiment is the same as described with reference to FIGS. 1-5.

In all embodiments of the invention, the metal employed for the member or members presenting the cam follower surface and the member presenting the camming surface should be of similar metals, so as to minimize corrosion, and of substantially the same hardness. Surface hardening treatments for the cam follower surface and the camming surface should be the same or similar. When a split ring is employed as the member presenting the cam follower surface, the ring should be of very high strength alloy steel.

While connectors have been shown and described to illustrate the invention when the locking groove opens outwardly and the locking means is contracted to lock, the connectors can operate in the opposite mode, with the locking means being expanded to engage an inwardly opening groove. Other forms of power devices than those illustrated can be employed, and when simple rectilinear motors are employed, the motors can be arranged above, rather than below, the locking ring.

What is claimed is:

1. In a connector for securing two members together under a large clamping force, the combination of
   a connector body adapted to be secured rigidly to one of the members;
   generally annular locking means having
      a frustoconical locking shoulder, and
      an annular cam follower surface concentric with the axis of the connector body and tapering axially with respect to the connector body, the locking means being supported on the connector body for radial movement between an inactive position, in which the diameter of the locking means allows the connector body to be moved axially relative to the other member to be secured so as to place the locking means in operative position relative to the other member, and an active position, in which the diameter of the locking means is such that said locking shoulder will engage coacting locking means on the other member to be secured;

a driving ring having a generally annular axially tapering camming surface parallel to said cam follower surface and concentric therewith, said camming surface and cam follower surface being spaced apart radially;

a plurality of rigid rolling antifriction elements disposed and retained between said camming surface and cam follower surface and engaged therewith; and means carried by the connector body and supporting the driving ring for axial movement between a first position, in which the camming ring allows the locking means to occupy said inactive position, and a second position, in which the locking means is forced by coaction of said camming surface, said rolling antifriction elements and said cam follower surface to occupy said active position.

2. The combination defined by claim 1 and further comprising
power means carried by said connector body for moving the driving ring between said first and second positions.

3. The combination defined by claim 1, wherein said frustoconical locking shoulder is disposed at the inner periphery of the locking means and the driving ring surrounds the locking means.

4. The combination defined by claim 1, wherein said cam follower surface and said camming surface extend and parallel frustoconical surfaces and said rolling antifriction elements are spherical.

5. The combination defined by claim 1, wherein said camming surface and said cam follower surface each comprises a plurality of flat portions each disposed at an angle to the axis of the connector body;
each flat portion of said cam follower surface is opposed to a flat portion of said camming surface; and
said rolling antifriction elements are cylindrical rollers each engaged between a different opposed pair of said flat portions.

6. The combination defined by claim 1, wherein said camming surface is axially substantially longer than said cam follower surface.

7. The combination defined by claim 1, wherein the locking means is yieldably biased toward the driving ring to maintain said rolling antifriction elements engaged between said cam follower surface and said camming surface when the locking means occupies said inactive position and the driving ring occupies said first position.

8. The combination defined by claim 1, wherein one of said cam follower surface and said camming surface is provided with a plurality of axially extending grooves and said rolling antifriction elements are each disposed in one of said grooves.

9. The combination defined in claim 1, wherein the locking means comprises a plurality of arcuate segments arranged in an annular series, said locking shoulder being constituted by a plurality of arcuate shoulder portions each presented by one of said segments, and a plurality of arcuate follower portions each secured rigidly to a different one of the segments, said cam follower surface of the locking means being constituted by a plurality of portions each presented by one of said follower portions.

10. The combination defined in claim 1, wherein the locking means comprises a resilient metal split ring, the cam follower surface being presented by said split ring.

11. The combination defined in claim 1, wherein the driving ring comprises
a flat annular portion lying in a plane transverse to the axis of the connector, and
an annular flange portion depending from the flat annular portion at the inner periphery thereof; and
the camming surface extends over the inner periphery of the flat portion and the flange portion.

12. The combination defined in claim 2, wherein the driving ring comprises
a flat annular portion lying in a plane transverse to the axis of the connector, and
an annular flange portion projecting axially from the inner periphery of the flat annular portion,
the camming surface of the driving ring extending over the inner peripheries of the flat portion and the beat annular portion; and the power means comprises a plurality of rectilinear motors arranged in an annular series with the motors being located on the side of the flange portion of the driving ring which is opposite the camming surface, the driven elements of the motors being connected to the flange portion of the driving ring.

13. The combination defined by claim 1, wherein the number and size of the antifriction elements is such that, for any position of the driving ring, the anti-friction elements occupy only a portion of the axial extent of the cam follower and camming surfaces,
the axial extent of the cam follower and camming surfaces being sufficiently great to allow free rolling movement of the anti-friction elements throughout travel of the driving ring from its first position to its second position.

14. The combination defined by claim 13, wherein the locking means is yieldably biased toward its inactive position and the antifriction elements are positively engaged between the cam follower and camming surfaces as a result of the yieldable bias of the locking means when the locking means is in its inactive position.

15. In an underwater well installation, the combination of
a first well member having
an upright through bore,
an annular upwardly directed end surface surrounding the through bore, and
a transverse annular outwardly opening locking groove,
the side wall of said groove nearer said end surface being frustoconical and tapering downwardly and inwardly;

a second wall member disposed above the first well member and having an annular downwardly directed surface seated on the upwardly directed end surface of the first well member;

a generally annular connector body secured rigidly to the second well member, depending therefrom and surrounding the upper end portion of the first well member;

generally annular locking means carried by the connector body and having an inner peripheral portion presenting a frustoconical shoulder tapering downwardly and inwardly at the same angle as does said side wall of the locking groove, an annular cam follower surface concentric with and spaced outwardly from the locking shoulder, the cam follower surface tapering upwardly and inwardly, the locking means being supported by the connector body for radial movement between an outer inactive position, in which the inner diameter of the locking means is adequate to allow the connector body to be moved axially relative to the first well member, and an inner active position, in which the shoulder of the locking means is in flush engagement with said side wall of the locking groove;

a driving ring having at its inner periphery an annular camming surface which tapers upwardly and inwardly and is parallel to and spaced outwardly from the cam follower surface, the driving ring being supported by the connector body for axial movement between an upper position and a lower position; and a plurality of rigid rolling antifriction elements disposed between and in free rolling contact with said camming surface and said cam follower surface;

the axial length of the camming surface, the angle of taper of the camming and cam follower surfaces, the radial dimensions of the locking means, and the axial space between said side wall of the locking groove and said upwardly directed end surface being such that movement of the driving ring to its lower position moves the camming surface, the cam follower surface, the rolling antifriction elements and the locking means radially inwardly with wedging coaction between said shoulder and said side wall of the groove and clamps said end surface and said downwardly directed surface together.

* * * * *